Nov. 19, 1963  S. ZECHTER ET AL  3,111,622
TIME CONSTANT MEASURING CIRCUIT
Filed Feb. 19, 1960  3 Sheets-Sheet 1

INVENTORS
SOL ZECHTER
HAROLD GRUEN
ROBERT F. GOLDEN
BY Robert D. Sanborn
ATTORNEY Nov. 19, 1963  S. ZECHTER ET AL  3,111,622
TIME CONSTANT MEASURING CIRCUIT
Filed Feb. 19, 1960  3 Sheets-Sheet 2

I = SERIES RC
II = SERIES RL
III = PARALLEL RC
IV = PARALLEL RL
V = TEST

INVENTORS
SOL ZECHTER
HAROLD GRUEN
ROBERT F. GOLDEN
BY Robert D. Sanborn
ATTORNEY Nov. 19, 1963 — S. ZECHTER ET AL — 3,111,622
TIME CONSTANT MEASURING CIRCUIT
Filed Feb. 19, 1960 — 3 Sheets-Sheet 3
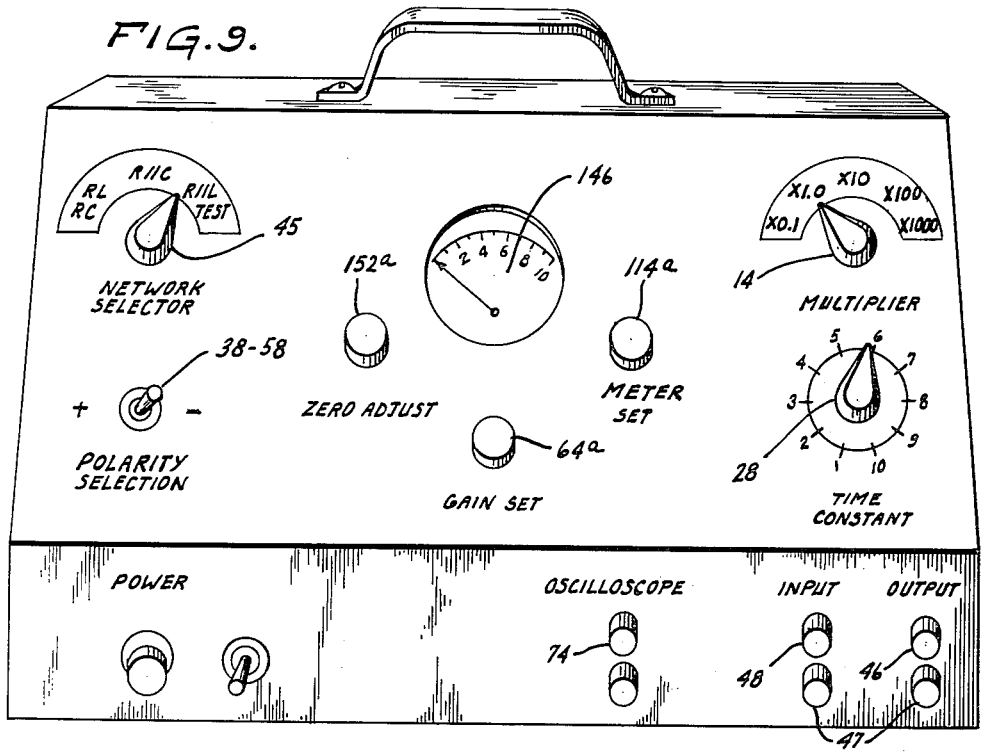
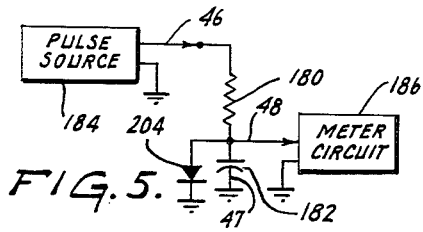
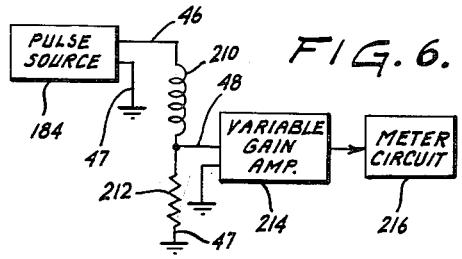
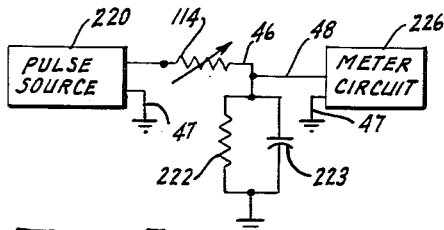
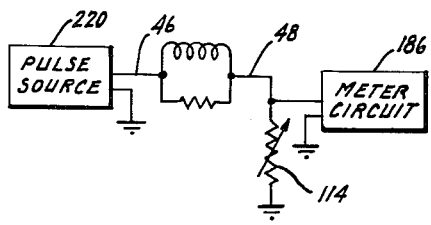
INVENTORS
SOL ZECHTER
HAROLD GRUEN
ROBERT F. GOLDEN
BY Robert D. Sanborn
ATTORNEY United States Patent Office 3,111,622
Patented Nov. 19, 1963

1

3,111,622
TIME CONSTANT MEASURING CIRCUIT
Sol Zechter, Broomall, Harold Gruen, Elkins Park, and Robert F. Golden, Philadelphia, Pa., assignors, by mesne assignments, to Philco Corporation, Philadelphia, Pa., a corporation of Delaware
Filed Feb. 19, 1960, Ser. No. 9,878
14 Claims. (Cl. 324—57)

The present invention relates to circuit testers and more particularly to circuit testers for measuring the time constant of passive circuits and circuit elements.

In servicing complex electronic equipment, it is desirable to locate faulty elements with minimum disturbance of the circuit. Ideally, the faulty element or elements in the circuit should be located without removing or disconnecting any of the elements of the circuit since nondefective elements may be rendered defective by heat or mechanical breakage occasioned by the removal and/or reinsertion into the circuit. Testing the resistances and voltages at various points in the circuit and the in-circuit testing of transistors as described and claimed in the copending application of Zechter and Gruen, Serial No. 811,842, now United States Patent No. 3,051,900, issued August 28, 1962, is helpful in locating faults but not all faults can be located by these tests. Further data on the condition of the various elements of the circuit under test can be obtained by determining the effective time constant of the circuit measured at selected points in the circuit.

Therefore it is an object of the present invention to provide means for measuring the time constant of passive circuit elements.

A further object is to provide means for in-circuit measurement of time constants at various points in an electronic network.

Still another object is to provide a time constant measuring circuit which is substantially free of the loading effects of active elements in a circuit under test.

In general, these and other objects of the present invention are achieved by providing a source of pulses of known but variable widths and means for supplying these pulses to the circuit under test. A circuit is provided for indicating the amplitude of the supplied pulses and the amplitude of the signal at selected points in the circuit at the end of each supplied pulse. The time constant of the circuit is determined by determining the length of pulse required to provide a meter indication equal to a preselected fraction of the amplitude of the supplied pulses. Means are provided for reversing the polarity of the pulses in order to minimize loading effects of any active elements in the circuit. For a better understanding of the present invention, together with other and further objects thereof, reference should now be made to the following detailed description which is to be read in conjunction with the accompanying drawings in which:

2

Figure 1:
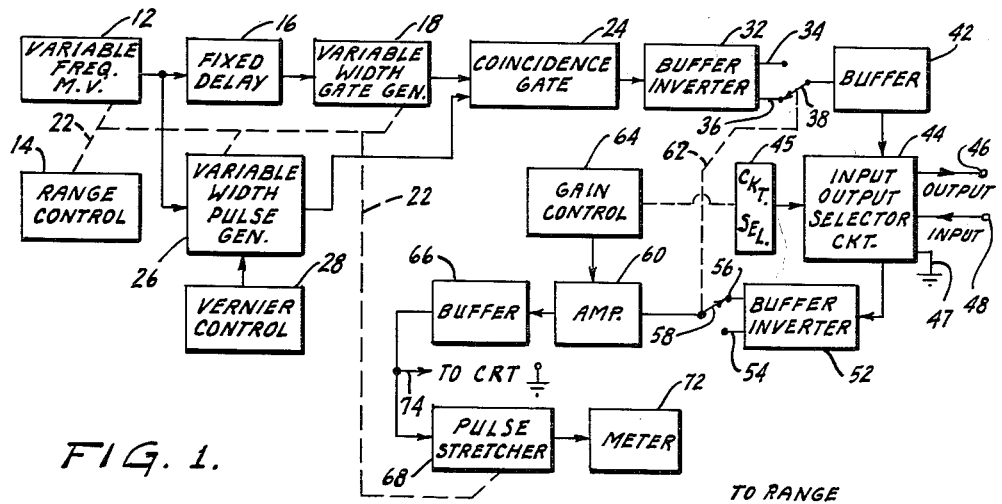
FIG. 1 is a block diagram of a preferred embodiment of the present invention.

FIGS. 5 through 8 are simplified diagrams, partially in block form, illustrating the circuit configurations employed in measuring the time constants of various circuit types; and FIG. 9 is a pictorial view showing a preferred arrangement of controls on an actual embodiment of the circuit of FIG. 1.

Multivibrator 12 in FIG. 1 is a free-running multivibrator which establishes the pulse repetition frequency of the test circuit. The accuracy of the measurement is not dependent upon the repetition frequency of multivibrator 12, and therefore any convenient free-running multivibrator circuit may be employed. Since the longest time constant to be measured may be of the order of $10^5$ times the shortest time constant, it is desirable that the pulse repetition period of multivibrator 12 be variable in steps. Five decade steps will cover the range mentioned. This may be accomplished by providing a turret or the equivalent thereof for switching timing capacitors of different value into the multivibrator circuit. The means for controlling the frequency of multivibrator 12 is represented in FIG. 1 by range control 14.

The output of multivibrator 12 is connected through a fixed delay means 16 to the synchronizing signal input of a variable width gate generator 18. Fixed delay 16 may be a unistable multivibrator circuit which is triggered by the output of multivibrator 12. Alternatively, it may be a delay line or other convenient form of delay circuit. Gate generator 18 may be a second unistable multivibrator which is synchronized by the signal supplied by delay means 16. Gate generator 18 is required to produce a gate circuit which has a width greater than approximately one-tenth but less than a full repetition period of the signal supplied by multivibrator 12. Preferably the width of the pulses supplied by gate generator 18 lies between one-tenth and four-tenths the pulse repetition period of the signal supplied by multivibrator 12. Since the pulse repetition period of multivibrator 12 is varied in steps by range control 14, gate generator 18 must include means for varying the width of the pulses supplied thereby. Again this may be accomplished by means of a turret controlled by range control 14 which switches capacitors or resistors of different value into the timing circuit of the gate generator 18. The coupling between range control 14 and the various elements of the circuit of FIG. 1 is schematically illustrated by the broken line 22.

The output of gate generator 18 is supplied to one input of a coincidence gate circuit 24. Coincidence gate circuits are generally known in computer art as "and" gates.

The output of variable frequency multivibrator 12 is supplied also to the input of a variable width pulse generator 26. Generator 26 may be similar to gate generator 18 except that it includes means responsive to range control 14 for varying the width of the output pulse in steps and means responsive to vernier control 28 for incrementally varying the width of the output pulses. The step control of variable width pulse generator 26 may be accomplished by means of a turret or the equivalent for switching capacitors of different values into the pulse generator circuit. The vernier control 28 may be accomplished by providing a continuously adjustable resistor or capacitor in the variable pulse width generator circuit.

The output of variable pulse width generator 26 is supplied to a second input of coincidence gate 24. Coincidence gate 24 provides an output signal only when signals are supplied to the two inputs thereof. Therefore the output of coincidence gate 24 is a pulse having a width which is dependent upon the amount of overlap of the gate supplied by variable width gate generator 18 and the pulse supplied by variable width pulse generator 26. Preferably, the width of the pulse appearing at the output of coincidence gate 24 will vary from zero to approximately one-fifth the pulse repetition period of multivibrator 12.

The output of coincidence gate 24 is supplied to a buffer inverter circuit 32 which has two outputs 34 and 36. Buffer inverter 32 supplies pulses at output 34 which have a predetermined amplitude and a time duration equal to the time duration of the signal supplied by coincidence circuit 24. Buffer inverter 32 supplies at output connection 36 a pulse corresponding in amplitude and time duration but opposite in polarity to the pulse appearing on output 34. A switch 38 is provided for connecting a selected one of the outputs 34 and 36 to the input of a buffer amplifier 42.

The output of buffer amplifier 42 is supplied to an input-output selector circuit 44 which supplies the output pulses of selected polarity and time duration to the circuit under test by way of output connection 46. Input-output selector circuit 44 is provided with a second connection 48 for receiving an integrated form of the output pulse signal from the circuit under test. Ground connection 47 is common to the input and output circuits. A preferred form of input-output selector circuit is described in detail in FIG. 3.

The signal received by way of input connection 48 is supplied to a second buffer inverter circuit 52 which is similar in nature to buffer inverter 32. Inverter 52 provides two similar signals of opposite polarity on output connections 54 and 56, respectively. A switch 58 selects one of the two output signals and supplies the selected output signal to the input of amplifier 60. Switches 38 and 58 are ganged as shown by the dashed line 62. The switches 38 and 58 are so arranged that the pulses supplied to the input of amplifier 60 are always of the same polarity. Amplifier 60 is provided with a gain control 64. The function of gain control 64 will be explained in more detail in connection with the description of FIG. 3.

The output of amplifier 60 is supplied through a buffer stage 66 to the input of a pulse stretcher circuit 68. Pulse stretcher circuit 68 provides a constant output voltage proportional to the peak amplitude of the signals supplied by buffer 66. One preferred form of pulse stretcher is shown in detail in FIG. 3. Since the interval between successive pulses supplied by buffer 66 may vary by a factor of as much as $10^4$ depending upon the setting of range control 14, it is desirable to change the time constant of the pulse stretcher 68 as range control 14 is varied. Again this may be arranged by mechanically coupling a turret or the equivalent in pulse stretcher 68 to the range control 14 as indicated by the broken line 22.

A meter 72 is connected to the output of pulse stretcher 68 for indicating the amplitude of the direct voltage supplied by pulse stretcher 68. A connection 74 is provided at the output of buffer 66 for supplying the pulse signals derived from input 48 to a cathode ray oscilloscope or the like. The shape of the pulses supplied to input 48 as well as their amplitude is helpful in determining the operating condition of the circuit under test.

The detailed circuits of FIGS. 2 and 3 will now be described in order that the operation of the invention may be more readily appreciated. Circuits in FIGS. 2 and 3 corresponding to the blocks in FIG. 1 have been identified by the same reference numerals. It will be seen from FIG. 2 that multivibrator 12 is conventional in form except that it includes turret means or the equivalent for switching into the circuit different frequency determining capacitors 90. This may be accomplished by mounting the capacitors 90 on a turret similar to the turrets employed in television tuners. Alternatively wafer switches or the like may be employed to connect other or additional capacitors into the multivibrator circuit as the switch is rotated. The wafer switches may be ganged so as to be operated in synchronism by range control 14. The repetition period of multivibrator 12 should be approximately ten times greater than the largest time constant to be measured on a given scale. Thus, if the circuit is to measure time constants in the range of one to ten microseconds for a given setting of range control 14, the repetition period of multivibrator 12 should be at least one hundred microseconds for this setting.

Figure 2:
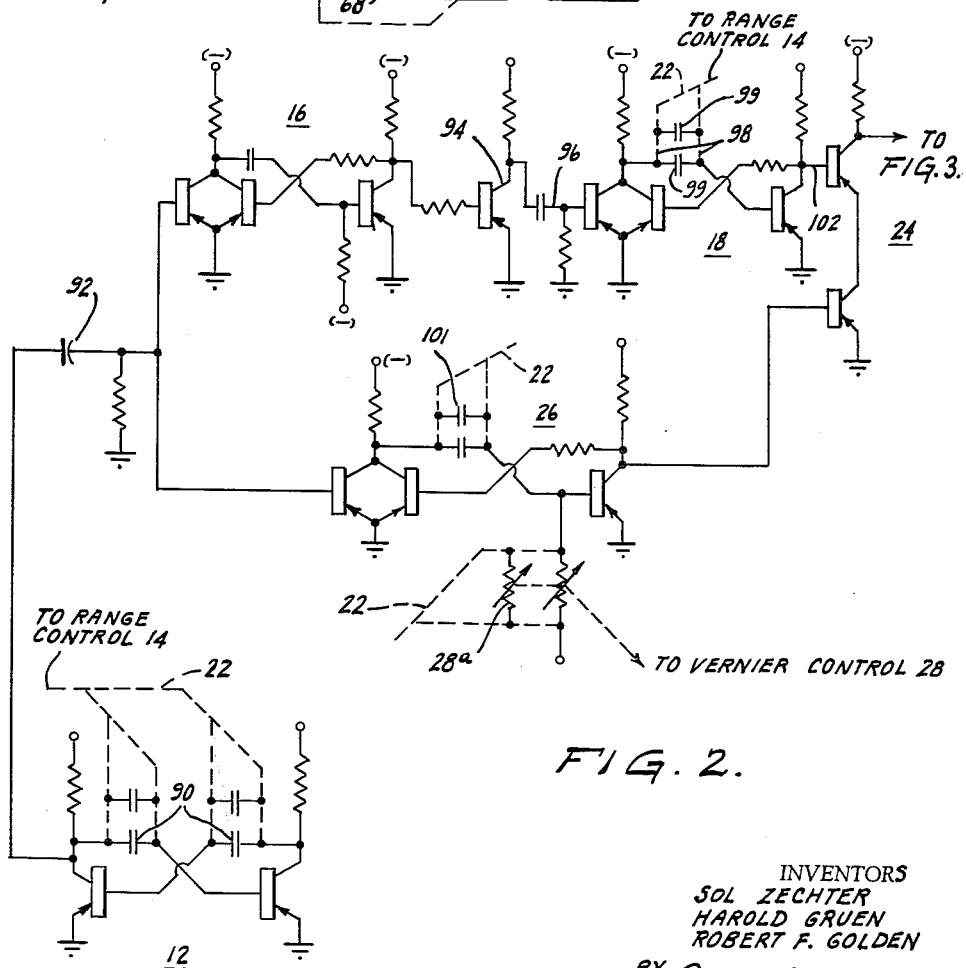
FIG. 2 is a schematic diagram of the pulse generating portion of the circuit of FIG. 1.

The resistor-capacitor coupling network 92 of FIG. 2 differentiates the output of multivibrator 12 so that a short, sharp synchronizing pulse is supplied to delay multivibrator 60 and variable width pulse generator 26 on each cycle of multivibrator 12. The delay multivibrator 16 of FIG. 2 is a conventional unistable multivibrator and so requires no further description. In a typical circuit multivibrator 16 has a pulse width of approximately one microsecond.

The output signal of delay multivibrator 16 is passed through an inverter circuit 94 and a differentiating coupling circuit 96 to the input of variable width gate generator 18. The inverter 94 is included so that variable width gate generator 18 is triggered by the trailing edge of the pulse supplied by delay circuit 16. It will be seen that variable width gate generator 18 of FIG. 2 is a conventional unistable multivibrator which includes means 98 for placing a selected one of the capacitors 99 into the width control circuit of gate generator 18.

The output of gate generator 18 is supplied to one input 102 of the coincidence circuit 24. Coincidence circuit 24 is the type of circuit known in the computer art as a "two-high and gate." The preferred form of variable width pulse generator 26 shown in FIG. 2 is similar to the preferred form of gate generator 18 except that two turrets or the equivalent are provided in pulse generator 26. One turret switches capacitors 101 into the circuit and the other turret switches variable resistors 28ª into the circuit. In the following description it will be assumed that the length of the pulses from generator 26 are controlled in decade steps by control 14. However, it is to be understood that other increments may be chosen if desired. Resistors 28ª provide a vernier control of the width of the pulses supplied by pulse generator 26. It is usually preferable to provide a different capacitor 101 for each range of pulse widths, but the same resistor 28ª may be employed on more than one range if desired. The selected resistor 28ª should be capable of varying the width of the output pulse over a range equal to the step change in width produced by changing capacitors 101. The output of gate generator 26 is connected to the second input of "and" gate 24.

As explained above, the circuit shown in FIG. 2 comprises a preferred means for generating pulses of variable but accurately known time duration. However the operation of the measuring circuit of FIG. 3 does not depend on how the variable width pulses are generated. Therefore, the present invention is not to be limited to the circuit shown in block form in FIG. 1 and schematic form in FIG. 2.

Figures 3, 4:
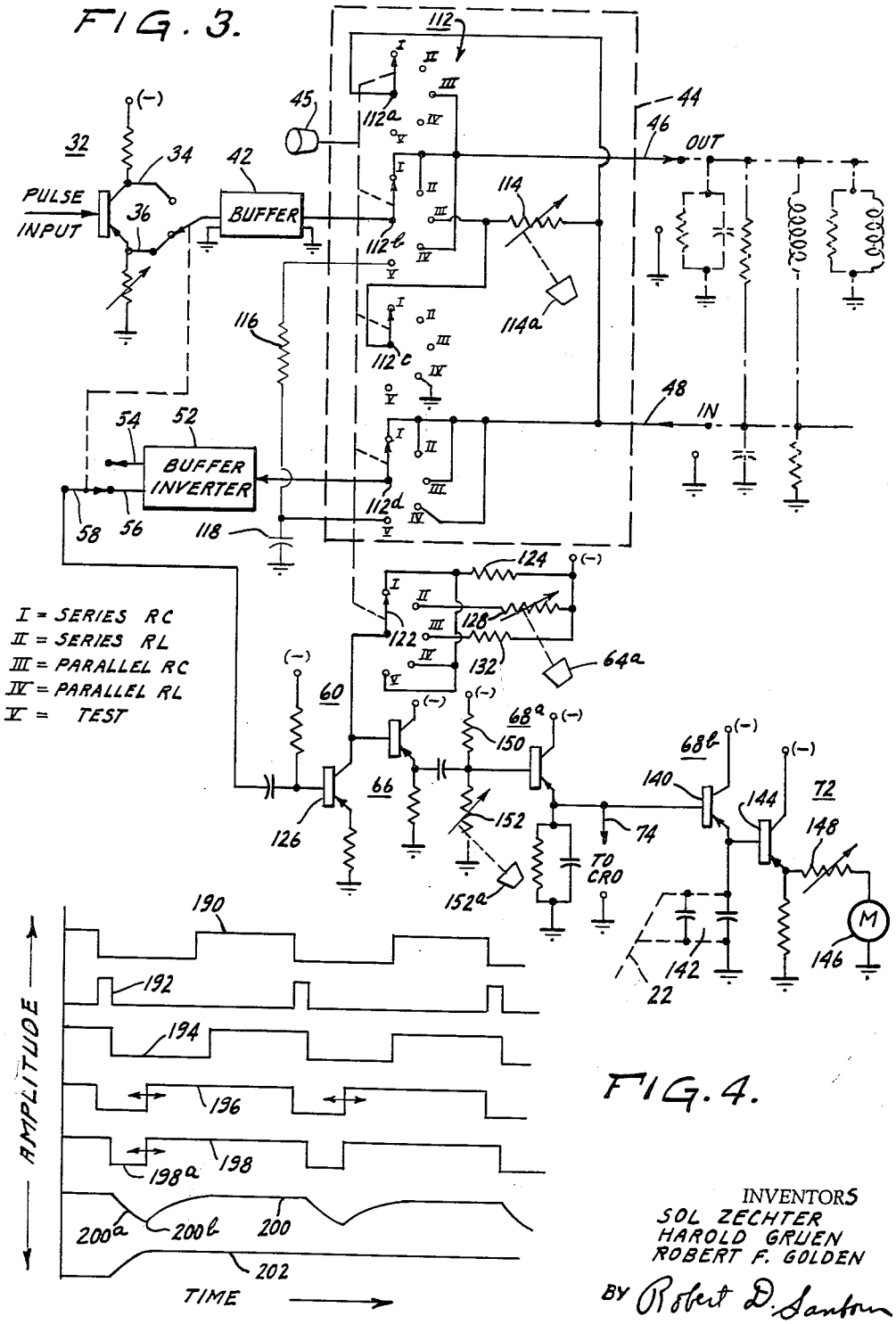
FIG. 3 is a schematic diagram of the measuring portion of the circuit of FIG. 1.
FIG. 4 is a series of waveforms illustrating signals present at various points in the circuit of FIG. 1.

Turning now to FIG. 3 the buffer inverter 32 comprises a transistor stage having both an emitter load impedance and a collector load impedance. Buffer inverter 52 is shown in block form in FIG. 3 in order to simplify the drawing. This circuit may be identical to buffer inverter 32. Buffer 42 is also shown in block form in FIG. 3 since it comprises merely a series of emitter followers in cascade to provide a low impedance drive for the output circuit.

The input-output selector of FIG. 3 comprises a four gang, five position switch 112, the gangs of which are identified by the reference numerals 112ª through 112ᵈ. The rotor of gang 112ᵇ is connected to the output of buffer 42. Positions I, II and IV of gang 112ᵇ are connected directly to the output connection 46. Position III of gang 112ᵇ is connected to output connection 46 through an adjustable resistor 114, the rotor of gang 112ª and position III of gang 112ª. Position V of switch 112 is a test position. This position is optional and may be omitted without limiting the utility of the test set. In this position the rotor of gang 112ᵇ is connected to the resistor terminal of a series resistor-capacitor test circuit 116—118. Gang 112ᶜ grounds the terminal of resistor 114 which is connected to position III of gang 112ᵇ when switch 112 is rotated to position IV.

Positions I through IV of gang 112ᵈ connect input connection 48 to the input of buffer inverter 52. Position V on gang 112ᵈ connects input connection 48 to the junction of resistor 116 and capacitor 118.

In FIG. 3 the circuit selector 45 of FIG. 1 comprises mechanical control means, such as a knob, for actuating gangs 112ª through 112ᵈ. Again the four gang, five position rotary switch has been shown merely by way of example. Other known forms of switching means for accomplishing the same circuit connections may be substituted therefor.

The output of buffer inverter 52 is coupled to the input of variable gain amplifier 60 through switch 58. The gain control of amplifier 60 which corresponds to gain control 64 of FIG. 1 includes a five-position switch 122 which is preferably ganged with switch 112 in the input-output selector circuit. Positions I, IV and V of switch 122 place resistor 124 in the collector circuit of transistor 126. Thus amplifier 60 has the same fixed gain on positions I, IV and V. Position II of switch 122 places adjustable resistor 128 in the collector circuit of transistor 126. Adjustable resistor 128 is provided with a knob or other suitable control 64ª to facilitate the adjustment of resistor 128. Preferably resistor 128 has a maximum value which is at least ten times the value of resistor 124. Position III of switch 122 places resistor 132 in the emitter circuit of transistor 126. Resistor 132 preferably has a resistance which is approximately ten times that of resistor 124.

Buffer 66 in FIG. 3 comprises an emitter follower circuit. The circuit of FIG. 3 includes one stage of pulse stretching 68ª preceding the output terminals 74. The second stage 68ᵇ of pulse stretching comprises a transistor 140 with turret means or the like for switching capacitors 142 into the emitter circuit thereof. The capacitors 142 are switched into the circuit by range control 14 of FIG. 1. Capacitors 142 preferably vary in value in approximately decade steps, although for practical purposes it may be desirable to make the larger capacitors somewhat smaller than the indicated decade values. Pulse stretcher circuits 68ª and 68ᵇ together stretch the input pulses to at least ten times and in most instances approximately 100 times the longest time constant to be measured on any given range.

The meter circuit 72 comprises an emitter follower 144 which supplies direct voltage to meter 146 through calibrating resistor 148. Resistor 148 is made adjustable to facilitate periodic calibration of the meter circuit. It is not varied during the operation of the measuring circuit. Fixed resistor 150 and adjustable resistor 152 form a potentiometer which controls the bias on the base of the transistor in pulse stretcher 68ª. Resistor 150 may be provided with a control knob 152ª located on the control panel of the test set. Since the circuits between meter 146 and pulse stretcher 68ª are directly coupled to one another, adjusting the value of resistor 152 will adjust the zero setting of meter 146.

FIG. 9 illustrates a typical arrangement of the controls for the circuit of FIGS. 1 through 3. The network selector switch 45 in the upper left-hand corner controls the four gangs of switch 112 and the single gang of switch 122. Switch 38—58 in the lower right-hand corner is a double pole, double throw switch which selects the polarity of the input signal to buffer 42 and the polarity of the output signal of buffer inverter 52. The "multiplier" switch in the upper right-hand corner corresponds to range control 14 of FIG. 1 and selects the basic pulse repetition period of multivibrator 12, the width of the gate signals provided by circuit 18, the range of widths of the pulses produced by circuit 26 and the degree of pulse stretching afforded by circuit 68. The "time constant" switch 28 in the lower right-hand corner of the test set of FIG. 9 corresponds to the vernier control 28 of FIG. 1 and controls the adjustable resistors 28ª of FIG. 2. Switches 14 and 28 together control the width of the pulses supplied at output terminal 46. Two ground terminals 47 are shown in FIG. 9. It will be shown presently that the width of the pulses supplied is directly related to the time constant to be measured. Therefore switches 14 and 28 may be calibrated directly in terms of seconds, microseconds or milliseconds. Zero adjust control 152ª in FIG. 9 corresponds to the similarly numbered control in FIG. 3 and is employed to adjust the meter 146 to read zero with the test set turned on but with no signal supplied to input terminals 48. Knob 114ª controls the value of resistor 114 which is in series with the output connection 46 if network selector 45 is in position II. In this position it will control the reading of meter 146. Therefore this knob 114ª is given the legend "meter set." Gain set control 64ª controls the value of resistor 128 of FIG. 3 which, in turn, controls the gain of amplifier 60. This control is effective only when network selector 45 is in position II, i.e. the series resistor-inductor position.

It should be understood that to use this test set effectively the general nature of the circuit under test must be known, i.e. does the particular portion of the circuit to be tested exhibit the characteristics of a resistor and capacitor in series, a resistor and capacitor in parallel, etc. Similarly the normal time constant of the portion of the circuit under test should be known so that any deviation from normal can be detected.

FIG. 5 is a simplified equivalent circuit of the test set of FIGS. 1–3 with circuit selector 45 set in position I. The circuit under test is schematically represented by a resistor 180 and a capacitor 182 in series. Pulse source 184 in FIG. 5 represents that portion of the circuit up to and including coincidence gate 24. Meter circuit 186 represents that portion of the circuit following the input-output selector circuit 44. Meter 146 is calibrated by means of resistor 148 so that it reads a selected reference value, for example full scale, if the input connection 48 is supplied with pulses having an amplitude equal to the peak amplitude of the pulses supplied by source 184. This adjustment is very stable and does not depend on the nature of the circuit under test. For this reason no operating knob for resistor 148 is provided on the face of the test set. However the calibration of meter 146 may be checked at any time and resistor 148 adjusted if necessary by setting the range selector switch 14 and time constant control 28 so that the pulses supplied by source 184 have a duration which is several times the time constant of the circuit under test. Under these conditions capacitor 182 will have time to charge to the full amplitude of the pulses supplied by source 184 and meter 146 should read the preselected reference value.

Once the calibration of meter 146 has been checked the time constant of the circuit under test can be determined by operating range control 14 and time constant control 28 to reduce the duration of the pulse supplied by source 184 until meter 146 reads a preselected fraction of the reference value. This point may be appropriately marked on the face of the meter 146. Since the charging and discharging of resistor-reactive circuits follows a known exponential curve, the fraction of the reference value which is selected is immaterial. For example, it is known that a capacitor in a series resistor-capacitor circuit will charge to 63.2% of the peak value of the applied pulse if the pulse has a duration equal to the time constant of the series circuit or it will charge to 50% of the peak value if the pulse has a duration equal to .65 times the time constant of the circuit. In the following examples it will be assumed that the two reference points selected are full scale and 63.2% of full scale. The conditions now present in the circuits of FIGS. 1–3 are illustrated by the waveforms of FIG. 4.

Waveform 190 in FIG. 4 illustrates the signal supplied by variable frequency multivibrator 12 of FIG. 1. The period of waveform 190 is preferably ten times the largest time constant to be measured on a given scale. Thus when multiplier switch 14 of FIG. 9 is set to measure time constants in the range of 1 to 10 microseconds, the repetition period of waveform 190 should be at least 100 microseconds. This period is determined by the size of the capacitors 90 of FIG. 2.

Waveform 192 of FIG. 4 represents the output signal of delay multivibrator 16. It will be noted that the waveform 192 is synchronized by the trailing edges of the positive pulses in waveform 190. In measuring time constants in the range from .1 to $10^4$ microseconds, the delay provided by delay multivibrator 16 may remain fixed at approximately 1 microsecond.

Waveform 194, which represents the output of variable width gate generator 18, is synchronized by the trailing edge of the positive portion of waveform 192. The negative going portion of waveform 194 must have a duration greater than the longest time constant to be measured on a given range. Again, if range switch 14 is set to the 1 to 10 microsecond range, the negative portion of waveform 194 may have a duration of approximately 50 microseconds.

Waveform 196 represents the output of variable width pulse generator 26. The negative going portion of waveform 196 must have a minimum value slightly less than the minimum time constant to be measured on a given range plus the delay provided by multivibrator 16. Thus, on the 1 to 10 microsecond range the negative portion of waveform 196 would have a minimum duration of less than 2 microseconds. The maximum duration of the negative pulse in waveform 196 must be equal to the longest time constant to be measured on a given range plus the duration of the positive portion of waveform 192. Again on the 1 to 10 microsecond range the maximum duration of the negative portion of waveform 196 must be in excess of 11 microseconds. The duration of the negative portion of waveform 196 is controlled by varying control 28 in FIG. 1 which varies the value of the selected resistor 28a in variable width pulse generator 26.

Waveform 198 represents the pulses appearing at the output of coincidence gate circuit 32. The pulses appearing at output connection 46 will be either as shown by waveform 198 of FIG. 4 or they will be of a polarity opposite to that shown by waveform 198 depending upon the position of switch 38.

Waveform 200 indicates the general form of the signal present on input connection 48. During portion 202ᵃ of waveform 200 the circuit under test starts to charge toward a value equal to the amplitude of the negative pulse 198ᵃ, which is the peak value of the output pulse. The duration of the output pulse is selected so that the circuit under test, i.e. capacitor 182 of FIG. 5, can charge only 63.2% of the peak amplitude of the output pulse during each output pulse. That is, the negative peak 200ᵇ of FIG. 4 is made equal to 63.2% of the negative amplitude 198ᵃ by controlling the duration of the output pulses. As explained above, the duration of the pulse which will give this value is exactly equal to the actual time constant of the circuit under test. The interval between output pulses is made very long compared to the pulse width so that the circuit under test will discharge completely in the interval between successive output pulses.

Waveform 202 represents the signal at the output of pulse stretcher 68. This signal rises to the peak value 200ᵇ on the first input pulse and remains substantially at this value as long as the output pulses are supplied to the circuit under test. Actually, the selected capacitor 142 in the pulse stretcher circuit 68ᵇ will discharge slightly in the interval between successive input signals and then will be recharged by the next input pulse. However, since the time constant of the pulse stretcher circuit is made very long compared to the interval between input pulses, the amplitude of the ripple on waveform 172 due to this charging and discharging is small compared to the steady component of the waveform 202.

Since the output pulse width is always set to equal a time constant (or some known fraction of a time constant if a reference point other than 63.2% of full scale is chosen) controls 14 and 28 may be calibrated directly in seconds, milliseconds or microseconds.

Diode 204 schematically represents an active circuit element which is connected across a portion of the circuit 180—182. In an actual circuit diode 204 may be a crystal diode, a transistor or other unilateral conducting device. It will be seen that diode 204 will have no effect on the charging time constant if negative pulses are supplied to terminal 46. It is impossible to measure the time constant of circuit 180—182 if positive pulses are supplied at output terminal 46. As explained above the polarity of the pulses at output terminal 46 may be selected by means of switch 38—58 of FIG. 9.

If network selector 45 is set to position II and the output terminal 46 and ground terminal 47 are connected, respectively, to the terminals of a series resistor-inductor circuit and the input terminals 47 and 48 are connected across the resistor in this circuit, the equivalent circuit of the test set and the circuit under test can be represented by the diagram of FIG. 6. Pulse source 184 of FIG. 6 corresponds to the similarly numbered block in FIG. 5. Inductor 210 and resistor 212 represent the equivalent series inductance and the equivalent series resistance, respectively, in the circuit under test. Variable gain amplifier 214 of FIG. 6 includes buffer inverter 52 and amplifier 60 of FIG. 1. Meter circuit 216 of FIG. 6 represents pulse stretcher 68 and meter 72 of FIG. 1.

It can be seen from FIG. 6 that if the inductor 210 has any appreciable resistance, this resistance component together with resistor 212 will form a voltage divider. This voltage divider will reduce the maximum possible voltage appearing across resistor 212 below the amplitude of the output pulses present on output connection 46. If not corrected this would lead to an erroneous reading of the time constant of the circuit. The effect of the resistive component of the inductance is overcome by increasing the gain of amplifier 60 of FIG. 1 until meter 146 reads full scale when the output pulses have a very long time duration compared to the time constant of the circuit under test. Once control 64ᵃ has been adjusted until meter 146 reads full scale with controls 14 and 28 set to provide relatively long output pulse, controls 14 and 28 may be readjusted until meter 146 reads 63.2% of full scale. The time constant of the circuit under test may now be read directly from the scales associated with controls 14 and 28.

Network selector 45 is set to position III to measure the time constant of a circuit which exhibits the characteristics of resistance and capacitance in parallel. The equivalent circuit for this condition is shown in FIG. 7. Meter circuit 226 of FIG. 7 corresponds to block 186 in FIG. 5 except that the gain of amplifier 60 is some fixed multiple of the gain available with selector 45 in position I and comprises the entire circuit which follows input connection 48 of FIG. 3. More specifically it includes buffer inverter 52, amplifier 60, buffer 66, pulse stretcher 68 and the meter circuit 72 of FIG. 1. It will be seen from FIG. 3 that fixed resistor 132 is in the collector circuit of transistor 126. Therefore gain control knob 64a is ineffective when network selector 45 is in position III. Pulse source 220 of FIG. 7 comprises a circuit of FIG. 2 and that portion of FIG. 3 up to the rotor of gang 112b on switch 112. Variable resistor 114 of FIG. 7 corresponds to the similarly numbered component in FIG. 3. It can be seen from FIG. 3 that resistor 114 is connected between the output of buffer 42 and output connection 46 by way of the third position of gang 112b and the third position of gang 112a. Resistor 222 and capacitor 223 schematically represent the circuit under test. It will be noted that pulse source 220 is connected across the series circuit comprising resistor 114 and resistor 222 and capacitor 223 in parallel and that meter circuit 186 is connected across capacitor 223. The maximum voltage appearing at input connection 48 for very long output pulses will be equal to the maximum amplitude of the output pulses divided by the ratio of the resistances of resistor 114 and 222. Since the gain of amplifier 60 in the meter circuit has been increased by a selected factor, for example 10, meter 146 will read full scale when resistor 114 is adjusted to approximately nine times the value of resistor 222, giving a ten-to-one ratio to the divider comprising resistor 114 and resistor 222. If the width of the output pulses is now reduced until meter 146 reads 63.2% of full scale, the time constant of the series circuit 114—223 may be read from scales 14 and 28. However, since the ratio of resistor 114 to resistor 222 is known, the time constant of circuit 222—223 can be computed. It can be shown that the charging time constant for the circuit 114—222—223 is very nearly equal to the time constant of the circuit 222—223, provided the resistance of resistor 114 is at least ten times that of resistor 222.

Position IV of network selector 45 is employed to measure the time constants of circuits exhibiting the characteristics of inductance and resistance in parallel. The equivalent circuit for this condition is shown in FIG. 8. It will be seen that this circuit is the resistor-inductor analog of the resistor-capacitor circuit of FIG. 7.

Position V of network selector 45 connects the test set in the configuration of FIG. 5 with resistor 116 and capacitor 118 taking the place of the external circuit resistance and capacitance represented by resistor 180 and capacitor 182 of FIG. 2. Since the time constant of the series circuit comparing resistor 116 and capacitor 118 is known, the accuracy of the scales associated with controls 14 and 28 may be determined. If desired, the internal test circuit may be omitted and the same result achieved by connecting a known value of resistance and capacitance to the input and output connections 46 and 48 then reading the time constant with network selector 45 in position I.

The test set of FIGS. 1–3 may be employed to measure resistance, capacitance or inductance of a circuit element by connecting the element to be measured in series with a second element of known value to form either a series inductor-resistor circuit or a series resistor-capacitor circuit. The unknown value can then be computed from the known value of the other element and the measured time constant.

While the invention has been described with reference to a single embodiment thereof, it will be apparent that various modifications and other embodiments thereof will occur to those skilled in the art within the scope of the invention. Accordingly we desire the scope of our invention to be limited only by the appended claims.

What is claimed is:

1. A circuit tester comprising pulse generating means for generating a series of recurrent pulses, the time width of the pulses in said series being small compared to the repetition period of said pulses, control means associated with said pulse generating means for controlling the width of said generated pulses, indicator means associated with said control means, said indicator means providing an indication representative of the time width of the pulses being generated by said pulse generating means, an input-output circuit having at least an output connection for supplying said generated pulses to selected points in the circuit to be tested and an input connection for receiving signals resulting from the application of said pulses from said circuit to be tested, means coupling said pulse generating means to said input-output circuit, a meter circuit coupled to said input connection of said input-output circuit, said meter circuit including amplifier means and peak voltage measuring means coupled to the output of said amplifier means and a multiposition selector means coupled to said input-output circuit and to said amplifier means in said meter circuit, said selector means in one position providing a relatively low series impedance between said pulse generating means and said output connection of said input-output circuit and causing said amplifier means to have a relatively low gain, said selector means in a different position providing a relatively higher series impedance between said pulse generating means and said output connection of said input-output circuit and causing said amplifier means to have a relatively higher gain.

2. A circuit tester in accordance with claim 1, said circuit tester further comprising additional gain control means associated with said amplifier means for controlling the gain of said amplifier means.

3. A circuit tester comprising pulse generating means for generating a series of recurrent pulses, the time width of the pulses in said series being small compared to the repetition period of said pulses, control means associated with said pulse generating means for controlling the width of said generated pulses, indicator means associated with said control means, said indicator means providing an indication representative of the time width of the pulses to be generated by said pulse generating means, input-output circuit means having an output connection for supplying generated pulses to selected points in a circuit to be tested and an input connection for receiving signals resulting from the application of said pulses to said circuit to be tested; variable resistance means, a meter circuit coupled to said input-output circuit, said meter circuit including an amplifier, peak voltage measuring means coupled to the output of said amplifier, and a multiposition selector means coupled to said variable resistance means and said amplifier in said meter circuit, said selector means in one position causing said variable resistance means to be connected in circuit between said pulse generating means and said output connection and causing said amplifier to have a relatively high gain and in a second position causing said pulse generating means to be coupled substantially directly to said output connection and causing said amplifier means to have a relatively low gain.

4. A circuit tester comprising pulse generating means for generating a series of recurrent pulses, the time width of the pulses in said series being small compared to the repetition period of said pulses, control means associated with said pulse generating means for controlling the width of said generated pulses, indicator means associated with said control means, said indicator means providing an indication representative of the time width of the pulses generated by said pulse generating means, an input-output circuit including a first connection, an output connection for supplying pulses to a circuit to be tested, an input connection for receiving signals from the circuit to be tested, a ground connection, a variable resistance means, means coupling said pulse generating means to said first connection of said input-output circuit and a meter circuit coupled to said input connection of said input-output circuit, said meter circuit including an amplifier, means for selectively controlling the gain of said amplifier, and peak voltage measuring means coupled to the output of said amplifier, a multiposition selector means coupled to said input-output circuit, said selector means in at least one position providing a relatively low fixed impedance between said first connection and said output connection, said selector means in a different position coupling said variable resistance means between said first connection and said output connection and said output connection to said input connection, said selector means in still another position connecting said variable resistance means between said input connection and said ground connection.

5. A circuit tester comprising pulse generating means for generating a series of recurrent pulses, the time width of the pulses in said series being small compared to the repetition period of said pulses, first control means associated with said pulse generating means for controlling both the repetition period and the width of said generated pulses, second control means associated with said pulse generating means for controlling the width of said pulses independently of said repetition period, indicator means associated with said first and second control means, said indicator means providing an indication representative of the time width of the pulses being generated by said pulse generating means, an input-output circuit including a first connection, an output connection for supplying pulses to a circuit to be tested, an input connection for receiving signals from the circuit to be tested, a ground connection, a variable resistance means, and a multiposition selector means coupled to said input-output circuit, said selector means in at least one position providing a relatively low fixed impedance between said first connection and said output connection, said selector means in a different position coupling said variable resistance means between said first connection and said output connection and said output connection to said input connection, said selector means in still another position coupling said variable resistance means between said input connection and said ground connection, means coupling said pulse generating means to said first connection of said input-output circuit, and a meter circuit coupled to said input connection of said input-output circuit, said meter circuit providing an indication representative of the peak amplitude of said signals received from said circuit to be tested.

6. A circuit tester as in claim 5 wherein said meter circuit includes an amplifier, means for controlling the gain of said amplifier and peak voltage measuring means coupled to the output of said amplifier.

7. A circuit tester as in claim 5, said circuit tester further comprising switch means for selectively reversing the polarity of the pulses supplied at said first connection.

8. A circuit tester as in claim 5, said circuit tester further comprising means associated with said input-output circuit for selectively reversing the polarity of the pulses supplied to said first connection and the polarity of the signals supplied from said input connection to said meter circuit.

9. A circuit tester as in claim 1, said circuit tester further comprising means associated with said input-output circuit for selectively reversing the polarity of the pulses supplied to said output connection and the polarity of the signal supplied from said input connection to said meter circiut.

10. A circuit tester as in claim 3, said circuit tester further comprising means associated with said input-output circuit for selectively reversing the polarity of the pulses supplied to said output connection and the polarity of the signal supplied from said input connection to said meter circuit.

11. A circuit tester comprising pulse generating means for generating a series of recurrent pulses, the time width of the pulses in said series being small compared to the repetition period of said pulses, control means associated with said pulse generating means for controlling the width of said generated pulses, indicator means associated with said control means, said indicator means providing an indication representative of the time width of the pulses generated by said pulse generating means, an input-output circuit including a first connection, an output connection for supplying pulses to a circuit to be tested, an input connection for receiving signals from the circuit to be tested, a ground connection, and a variable resistance means, means coupling said pulse generating means to said first connection of said input-output circuit, a meter circuit coupled to said input connection of said input-output circuit, said meter circuit including an amplifier, means for selectively controlling the gain of said amplifier, peak voltage measuring means coupled to the output of said amplifier, and a multiposition selector means coupled to said amplifier and to said input-output circuit, said selector means in first, second and third positions establishing a circuit path of relatively low fixed impedance between said first connection and said output connection, said selector means in said first and third positions causing said means for selectively controlling the gain of said amplifier to be ineffective, thereby to cause said amplifier to have a relatively low fixed gain, said selector means in said second position causing said means for selectively controlling the gain of said amplifier to be connected in circuit with said amplifier, thereby to cause said amplifier to have a gain determined by said means for selectively controlling the gain of said amplifier, said selector means in said third position connecting said variable resistance means between said input connection and said ground connection.

12. A circuit tester as in claim 11, said circuit tester further comprising means associated with said input-output circuit for selectively reversing the polarity of the pulses supplied to said first connection and the polarity of the signals supplied from said input connection to said meter circuit.

13. A circuit tester comprising pulse generating means for generating a series of recurrent pulses, the time width of the pulses in said series being small compared to the repetition period of said pulses, first control means associated with said pulse generating means for controlling both the repetition period and the width of said generated pulses, second control means associated with said pulse generating means for controlling the width of said pulses independently of said repetition period, indicator means associated with said first and second control means, said indicator means providing an indication representative of the time width of the pulses being generated by said pulse generating means, an input-output circuit including a first connection, an output connection for supplying pulses to a circuit to be tested, an input connection for receiving signals from the circuit to be tested, a ground connection, and a variable resistance means, means coupling said pulse generating means to said first connection of said input-output circuit, a meter circuit coupled to said input connection of said input-output circuit, said meter circuit including an amplifier, means for selectively controlling the gain of said amplifier, said meter circuit providing an indication representative of the peak amplitude of said signals received from said circuit to be tested, and a multiposition selector means coupled to said amplifier and to said input-output circuit, said selector means in first, second and third positions establishing a circuit path of relatively low fixed impedance between said first connection and said output connection, said selector means in said first and third positions causing said means for selectively controlling the gain of said amplifier to be ineffective, thereby to cause said amplifier to have a relatively low fixed gain, said selector means in said second position causing said means for selectively controlling the gain of said amplifier to be connected in circuit with said amplifier, thereby to cause said amplifier to have a gain determined by said means for selectively controlling the gain of said amplifier, said selector means in said third position connecting said variable resistance means between said input connection and said ground connection.

14. A circuit tester as in claim 13 wherein said multi-position selector means in a fourth position couples said output terminal to said input terminal, couples said variable resistance means between said first connection and said output connection, and causes said amplifier means to have a relatively high fixed gain.

References Cited in the file of this patent

UNITED STATES PATENTS

| | | |
|---|---|---|
| 2,757,336 | Smith-Vaniz | July 31, 1956 |
| 2,929,030 | Wier | Mar. 15, 1960 |
| 2,942,182 | Kramer | June 21, 1960 |
| 2,982,910 | De Boisblanc | May 2, 1961 |

OTHER REFERENCES

Moulic: Simplified Pulse Generator, Electronic Industries, September 1944, pp. 84, 85 and 224.

General Radio Experimenter, vol. XXVIII, No 10, March 1954, Pulses in a Small Package—A Pulse Generator for the Unit Line.

A Versatile Generator for Time-Domain Measurements, article in The General Radio Experimenter, May 1956.